(12) United States Patent
Horwitz et al.

(10) Patent No.: US 6,412,987 B1
(45) Date of Patent: Jul. 2, 2002

(54) ADAPTER SYSTEM USABLE IN CONJUNCTION WITH A FIBEROPTIC TERMINATION INSPECTION MICROSCOPE TO INSPECT FIBEROPTIC CABLE END CONNECTORS

(75) Inventors: Dennis N. Horwitz, Ventura; Ronald G. Boyer, Camarillo, both of CA (US)

(73) Assignee: Rifocs Corporation, Camarillo, CA (US)

( * ) Notice: Subject to any disclaimer, the term of this patent is extended or adjusted under 35 U.S.C. 154(b) by 43 days.

(21) Appl. No.: 09/580,605

(22) Filed: May 30, 2000

(51) Int. Cl.[7] .................................................. G02B 6/38
(52) U.S. Cl. ........................ 385/56; 359/391; 356/244
(58) Field of Search ............................. 385/56; 359/385, 359/391, 393; 356/244, 440, 73.1

(56) References Cited

U.S. PATENT DOCUMENTS

| | | | | |
|---|---|---|---|---|
| 4,571,037 A | * | 2/1986 | Esmay | 359/368 |
| 4,595,265 A | * | 6/1986 | Hodgson et al. | 359/383 |
| 4,640,578 A | | 2/1987 | Turner et al. | 359/385 |
| 4,671,629 A | | 6/1987 | Doyle | 359/804 |
| 5,196,899 A | | 3/1993 | Serwatka | 356/73.1 |
| 5,724,127 A | * | 3/1998 | Csipkes et al. | 356/73.1 |
| 5,731,893 A | * | 3/1998 | Dominique | 359/379 |

* cited by examiner

Primary Examiner—Brian Sircus
Assistant Examiner—Hae Moon Hyeon
(74) Attorney, Agent, or Firm—Jack C. Munro

(57) ABSTRACT

A plurality of different adapters for a fiberoptic termination inspection microscope which permits the microscope to be used with a plurality of cable connectors where each cable connector has one or more cable termini. The purpose of the microscope is to inspect a cable terminus to determine if such is clean and polished in order to insure low attenuation levels. If the cable terminus is dirty or scratched, the cable terminus can be replaced or repaired. An indicator can be used to disclose to the user exactly which cable terminus is being inspected.

10 Claims, 12 Drawing Sheets

ADAPTER SYSTEM USABLE IN CONJUNCTION WITH A FIBEROPTIC TERMINATION INSPECTION MICROSCOPE TO INSPECT FIBEROPTIC CABLE END CONNECTORS

BACKGROUND OF THE INVENTION

1) Field of the Invention

The subject matter of this invention is concerned with an optical inspection device and specifically a microscope to be used for surface inspection of a terminus of a fiberoptic cable within a fiberoptic connector.

2) Description of the Prior Art

Fiberoptic cables are being used in greater frequency within the telecommunication industry. Fiberoptic cables take the form of an elongated glass core which is clad with an outer layer of material which comprises a light guiding and protective covering for the core. Not only is light usable within the optical fiber as a means of illumination, but the light being transmitted along an optical fiber is equivalent to an electrical signal passing down a wire. One of the advantages of an optical fiber is that it has a much greater information carrying capacity than an electrical wire.

Optical fibers normally cannot be in one continuous length in an installation. Different lengths of the fibers inherently have to be connected together when extending from point A to point B as this may amount to many miles. This connecting of the optical fibers is achieved by means of cable connectors or splices. It is the purpose of the cable connector to locate one terminus of an optical fiber directly adjacent a terminus of a second optical fiber in an in-line connecting arrangement with the light that is being conducted through one optical fiber to pass through into the second optical fiber with very low loss occurring. These optical fibers are quite small in diameter with generally an optical fiber being no more than a few thousandths in diameter. If a terminus of an optical fiber becomes scratched or dirty, the light transmission from the first cable to the second cable can be diminished substantially and become inoperative. Because of the diameter being so small, it only takes a minuscule spec of dust to destroy the effectiveness of the light transmission qualities of the connector. It is common that during the performing of maintenance on fiberoptic cables that the connectors are disconnected and prior to being reinstalled that a microscope is used to inspect the termini of the optical fibers to determine if such are adequately clean and polished for the transmission of light. Dirty ends can then be cleaned and if the ends are scratched, the connector is usually replaced.

There are a wide variety of different types of connectors for fiberoptic cables. There are connectors for single cables, and the connectors for single cables are constructed of various sizes. There are also connectors that have two in number of optical fibers. There are also connectors that have three, four, five thirty plus or other plurality in number of optical fibers. In the past, inspection microscopes have been designed to be usable with only a few different types of cable connectors. However, prior to the present invention, it has not been known to utilize an inspection microscope in conjunction with a wide range of different types of fiberoptic connectors. The adapter system may also include a LED indicator to inform the user exactly which fiberoptic end face is being inspected. This is especially helpful when using a connector that has an array of optical fibers.

SUMMARY OF THE INVENTION

An adapter system which is designed in conjunction with an inspection microscope which facilitates inspection of the individual end faces of a fiberoptic connector, or an array, whether single channel or multi-channel. The adapter system includes a plurality of different adapters with each adapter being designed to be usable in conjunction with a particular type of cable connector. Each adapter of the adapter system is to be affixed in conjunction with a microscope in a particular position so as to utilize X-Y positioning within the microscope to center the image of the end of the optical fiber to achieve the visualization of such. Some adapters of the adapter system utilize a combination of X-Y and rotational positioning designed for a particular connector. Sliding or rotating of an adapter of the adapter system is to occur until the adapter becomes located in the desired position so as to expose the selected terminus face of the optical fiber for visual inspection. The adapter system of the present invention is constructed to include six different types of adapters which are to be connectable with most types of fiberoptic cable connectors so a single inspection microscope can be utilized with most types of fiberoptic cable connectors.

One of the objectives of the present invention is to construct an adapter which can permit an inspection microscope to be utilized with a series of different types of fiberoptic cable connectors.

DETAILED DESCRIPTION OF THE PREFERRED EMBODIMENT

Figure 1:
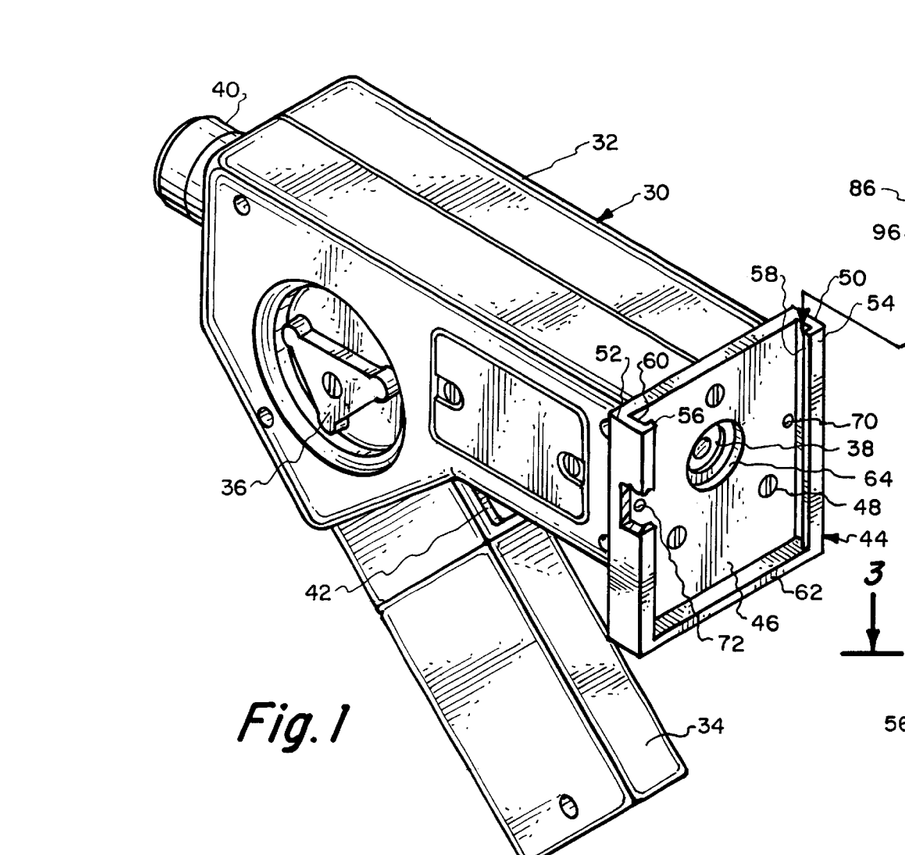
FIG. 1 is an exploded isometric view of one type of inspection microscope which has been modified to be usable with the adapter system of the present invention.
Figure 2:
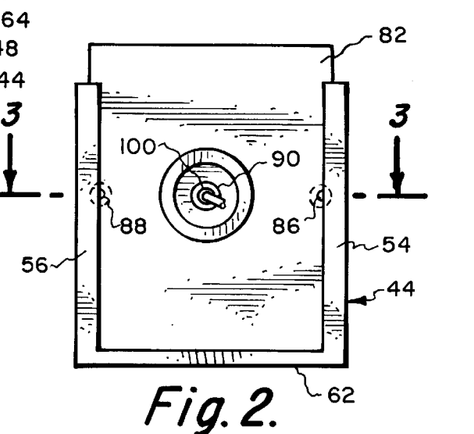
FIG. 2 is an end view of the adapter system of the present invention which is to be usable in conjunction with a single cable connector.

Referring particularly to FIG. 1 of the drawings, there is shown a microscope 30 which has a housing 32. The housing 32 includes a pistol grip handle 34. Mounted within the housing 32 is a knob 36 which is to be manually turned in order to adjust the focus of the image that is aligned with the visual inspection window 38. Observing of the image is by means of the user placing his or her eye against eyepiece 40. It is to be understood that within the microscope housing 32 there is mounted a battery source and a light source which is to illuminate the image. Activation of the light source is by means of depressing button 42.

Mounted in conjunction with the visual inspection window 38 is a female adapter 44. The female adapter 44 comprises a flat baseplate 46 which is fixedly mounted by screws 48 to the housing 32. The baseplate 46 is basically of a rectangular configuration. Integrally formed at the opposite side peripheral edges of the baseplate 46 are parallel sidewalls 50 and 52. The sidewall 50 includes an inwardly protruding flange 54 with sidewall 52 similarly including inwardly extending flange 56. The flange 54 in conjunction with the baseplate 46 produces a groove 58. Similarly, the flange 56 in conjunction with the baseplate 46 produces a groove 60. Also located at the bottom end of the baseplate 46 and extending between the sidewalls 50 and 52 is an end wall 62. Mounted within the baseplate 46 is a hole 64. Centered within the hole 64 is the visual inspection window 38.

Formed within the baseplate 46 and connecting with the groove 58 is a hole 66. In a similar manner, mounted within the baseplate 46 and connecting with the groove 60 is a hole 68. It is to be noted that the holes 66 and 68 are in transverse alignment. Generally, the holes 66 and 68 are aligned with the transverse diameter through the hole 64. Within hole 66 is located a ball 70. The outer portion of the hole 66 that connects with the groove 58 is narrowed slightly so that the ball 70 is not capable of falling free of the hole 66. In a similar manner, a precisely identical ball 72 is mounted within the hole 68. Outer portion of hole 68 is similarly narrowed to retain ball 72. Connecting with the ball 70 is a coil spring 74 with the spring 74 being mounted within the hole 66. A similar coil spring 76 is mounted within the hole 68 and connects with the ball 72. Mounted within the hole 66 and connecting with the inner end of the coil spring 74 is a set screw 78. A similar set screw 80 is mounted within the hole 68 and connects with the inner end of the spring 76.

Each of the balls 70 and 72 are biased to a slightly outwardly protruding position from the surface of the baseplate 46. The balls 70 and 72 produce, in part, a detent mechanism. The following discussion will result to a series of male adapters that are to be slidingly engaged with the grooves 58 and 60. Each will have a male adapter plate which slides into the female adapter 44.

Referring particularly to FIGS. 1–4 of the drawings, there is shown a first configuration of male adapter which has a substantially planer rectangularly shaped plate 82. Plate 82 has a substantially center hole 84. Also formed within the plate 82 is a hole 86 which is located directly adjacent the right side of the plate 82. There is also a similar hole 88 located directly adjacent the left side of the plate 82. Fixedly mounted within the center hole 84 is a fitting 90. Fitting 90 includes a sleeve 92 which has an internal elongated chamber 94. The fitting 90 also includes an enlarged chamber 96. A passage 98 connects the enlarged chamber 96 to the elongated chamber 94.

A fiberoptic terminus 100 has a forward end 102 which is to be snugly inserted within elongated chamber 94. Centrally mounted within the forward end 102 is a fiberoptic cable end 104. It is to be understood that this fiberoptic cable end 104 is hardly visible with the naked eye. Light from the microscope 30 represented by arrow 106, is transmitted through the hole 64, passage 98 and onto the forward end 102 illuminating the fiberoptic cable end 104. This fiberoptic cable end 104 is magnified as much as four hundred times. It is desirable that the fiberoptic cable end 104 be centrally positioned within the field of view of the microscope 30. In order to achieve this, the ball 70 is to rest within the hole 86 and the ball 72 is to rest within the hole 88 which produces a pair of detent mechanisms that correctly positions the plate 82 at the desired location within the grooves 58 and 60.

Figures 3, 5, 7:
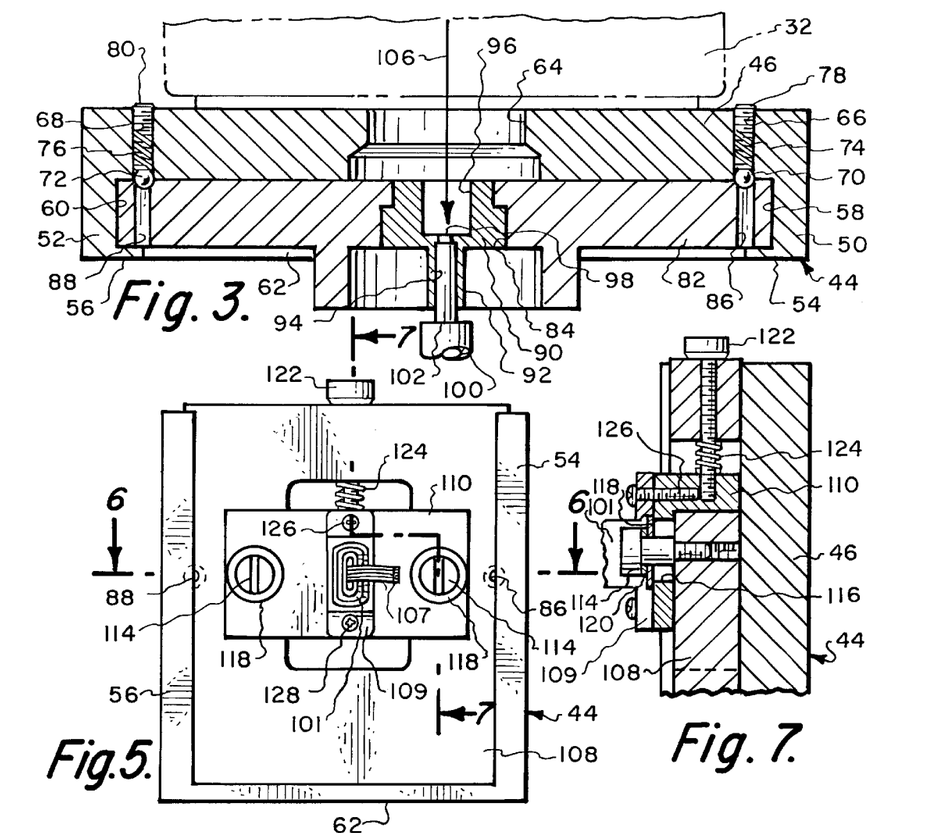
FIG. 3 is a cross-sectional view taken along line 3—3 of FIG. 2.
FIG. 5 is an end view similar to FIG. 2 but of a second configuration of adapter that is to be used in conjunction with a single cable connector that has a ribbon array of multiple fibers therein.
FIG. 7 is a vertical cross-sectional view taken along line 7—7 of FIG. 5.
Figure 4:
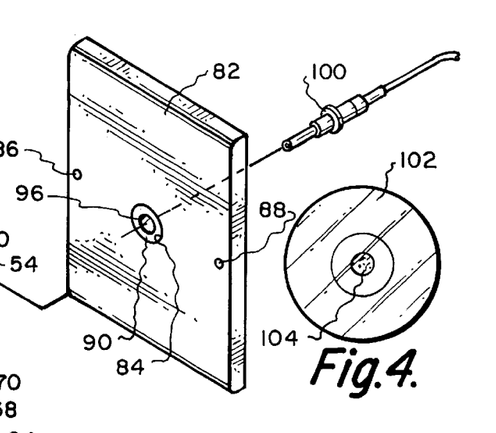
FIG. 4 is a view of the image that would be observable of the fiberoptic cable terminus within the fiberoptic cable connector using the configuration of adapter of FIG. 1.
Figure 6:
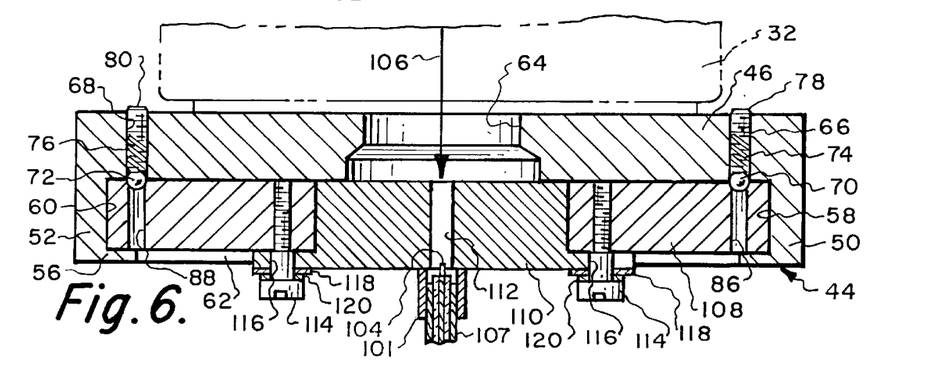
FIG. 6 is a transverse cross-sectional view taken along line 6—6 of FIG. 5.

Referring particularly to FIGS. 5–7 of the drawings, there is shown the second configuration of male adapter of this invention which is similar to the first configuration in that the second configuration also uses a plate 108. Plate 108 has holes 86 and 88 which function as the detent positioning arrangement between the plate 108 and the baseplate 46. The advantage of the second configuration of male adapter of this invention is that fiberoptic ribbon connector 101 is not mounted directly on the plate 108 but is mounted instead on member 110. Ribbon connector 101 has a series of individual optical fibers, forming a ribbon 107. Each individual optical fiber has an end 104. Normally, there are at least four and frequently twelve or greater in number of the individual optical fibers. The member 110 is mounted to the plate 108 by means of a pair of fasteners 114. Each fastener 114 passes through an oversized elongated hole 116 formed within the member 110. A washer 118 is mounted about each fastener 114 and associated with each washer 118 is a leaf spring washer 120. A threaded fastener 122 is mounted within plate 108 with the outer end of the fastener 122 being threadably received within the member 110. Between the member 110 and the plate 108 and surrounding the threaded shaft of the fastener 122 is a coil spring 124.

The advantage of the second configuration of male adapter of this invention is that once the adapter plate 108 is installed in its correct position within the grooves 58 and 60, and the balls 70 and 72 engage respectively with their holes 86 and 88, the user can adjust the position of the connector 101 by manually turning of fastener 122. This will cause the member 110 to move longitudinally or vertically relative to the plate 108 with this movement being limited by the length of the holes 116. Once a desired position is achieved and the fastener is released, the established position of the member 110 will remain. The whole purpose of this movement is to cause the end 104 to be moved within the field of view of the microscope 30 to precisely center the end 104 within the field of view. Threaded holes 126 and 128 are provided to facilitate connection to a ribbon connector mount 109. Ribbon connector mount 109 can take any configuration of numerous connector configurations.

Referring particularly to FIGS. 8–11 of the drawings, there is shown the third configuration of male adapter of this invention which utilizes of a plate 130 which is to be slid within the grooves 58 and 60. Plate 130 includes a pair of spaced-apart holes 132 and 134. Mounted within the hole 132 is a fitting 136. Similarly, a fitting 138 is mounted within the hole 134. Fitting 138 is basically identical to fitting 90 where the forward end 102 of the connector 100 is mounted within elongated chamber 94 of the fitting 138. It is to be noted that the plate 130 also includes a detent mechanism which includes holes 86 and 88 which are in alignment with the fitting 138. The holes 86 and 88 function in the same manner as was previously described.

The fitting 136 includes a sleeve 140 which is substantially smaller in diameter than the sleeve 92. The sleeve 140 fits over the forward end 142 of a different type of fiberoptic terminus 144. Located in transverse alignment with the fitting 136 and formed within the plate 130 are holes 146 and 148. The holes 146 and 148 function as a detent mechanism in the same manner as holes 86 and 88.

Figures 8, 9, 10:
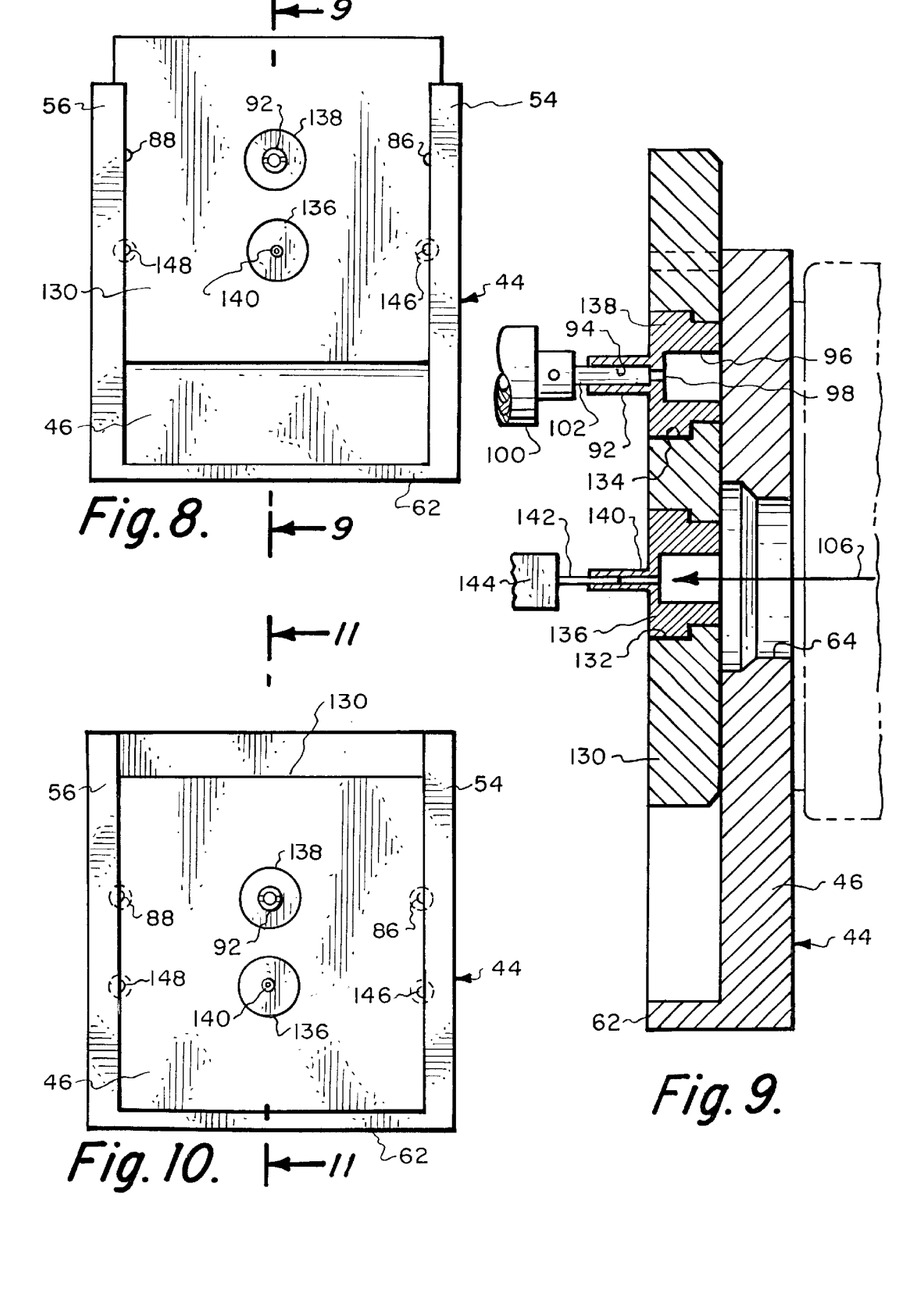
FIG. 8 is a view similar to FIG. 2 but of a third configuration of adapter within the adapter assembly of the present invention that is to be usable in conjunction with two different types of cable connectors.
FIG. 9 is a vertical cross-sectional view taken along line 9—9 of FIG. 8.
FIG. 10 is a view similar to FIG. 8 but with the adapter configuration being slid to a different position in conjunction with the mounting system of an inspection microscope.
Figure 11:
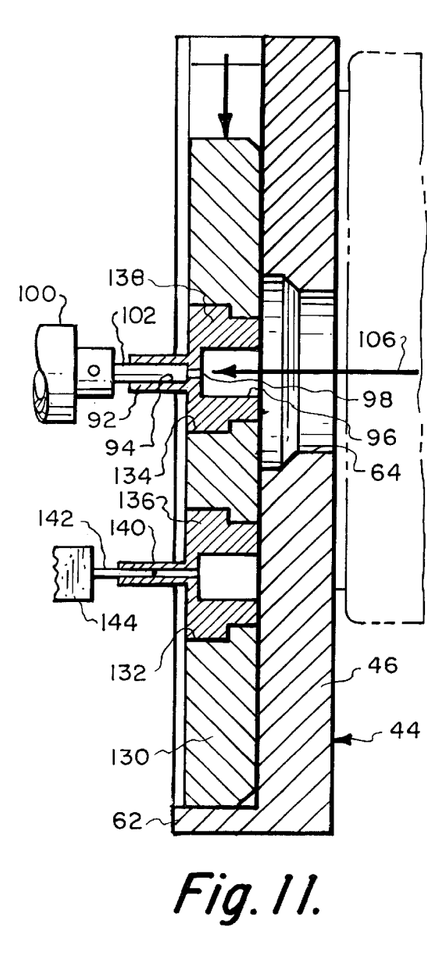
FIG. 11 is a vertical cross-sectional view taken along line 11—11 of FIG. 10.

The advantage of the third configuration of adapter of this invention is that the plate 130 has two different fittings 136 and 138 mounted thereon as opposed to the single fitting 90 that is mounted on plate 82. This means that plate 130 can connect with two different types of termini 100 and 144. The light beam, depicted by arrow 106, is used to illuminate the end 104 of connector 100 as shown in FIG. 11 of the drawings and the plate 130 is mounted within the grooves 58 and 60 as shown in FIG. 10 with ball 72 connecting with hole 88 and ball 70 connecting with hole 86. When it is desired to have the light illuminate the terminus 144 as shown in FIG. 9, the plate 130 is to be just slid within the grooves 58 and 60 until hole 148 connects with ball 72 and hole 146 connects with ball 70 which will align terminus 144 with the light beam depicted by arrow 106.

Figure 12:
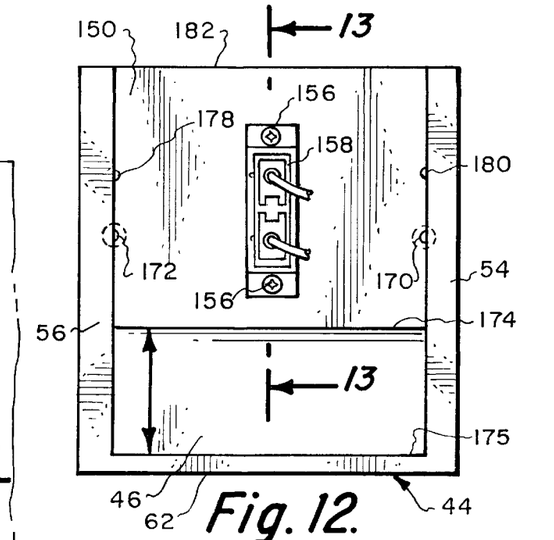
FIG. 12 is a view similar to FIG. 2 but of a fourth configuration of adapter which utilizes two fiberoptic cable connectors mounted within a single connector.
Figure 13:
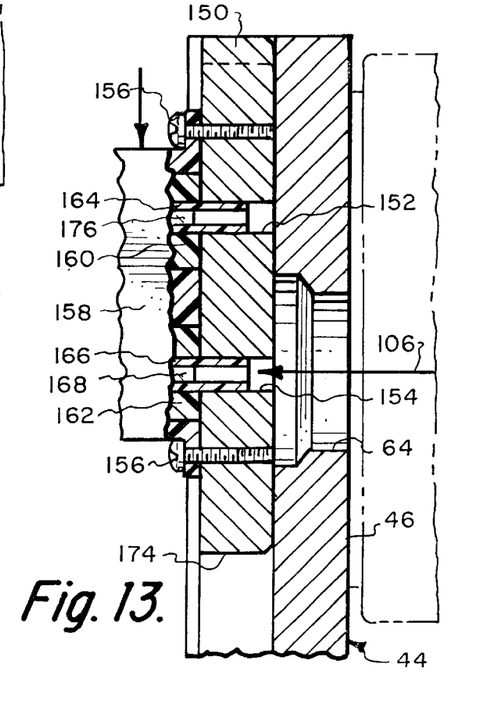
FIG. 13 is a vertical cross-sectional view taken along 13—13 of FIG. 12.
Figures 14, 15:
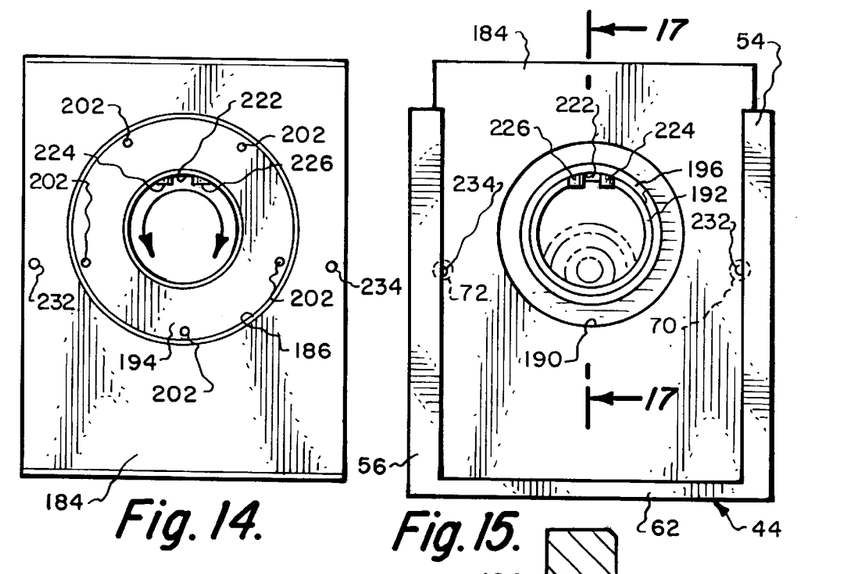
FIG. 14 is an end view of a fifth configuration of adapter of the adapter assembly of the present invention.
FIG. 15 is an end view of the fifth configuration of adapter that is mounted within the mounting of an inspection microscope.
Figure 16:
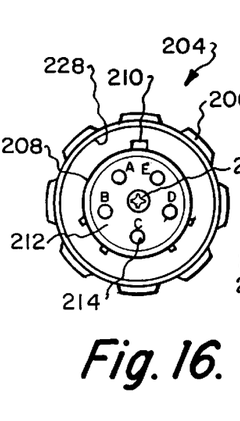
FIG. 16 is an end view of the cable connector which has five in number of termini mounted in conjunction with the connector.
Figure 17:
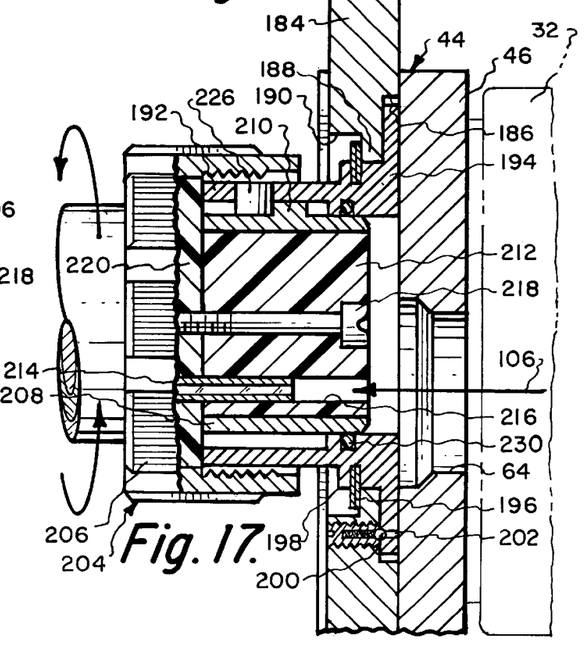
FIG. 17 is a vertical cross-sectional view taken along line 17—17 of FIG. 15.
Figure 18:
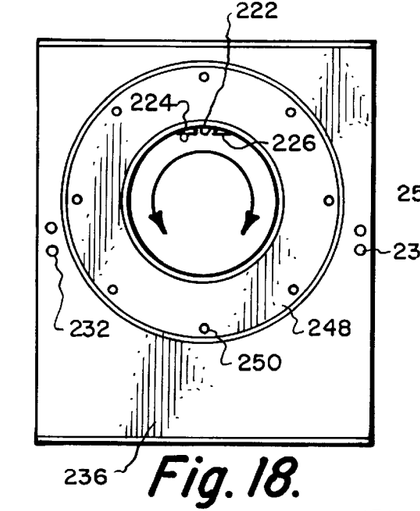
FIG. 18 is a view similar to FIG. 14 but of a sixth configuration of adapter.
Figure 19:
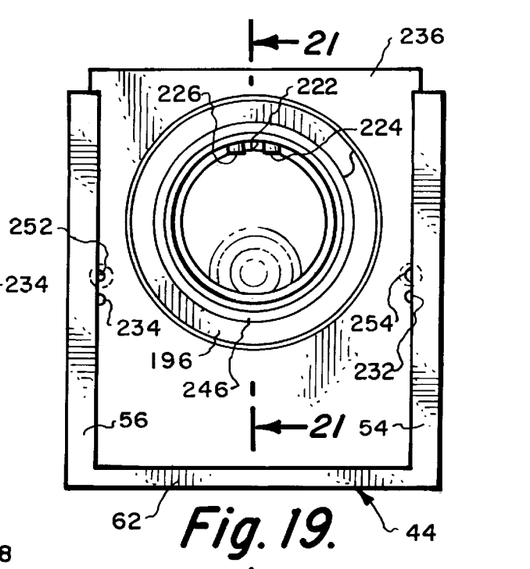
FIG. 19 is a view similar to FIG. 15 but of the sixth configuration of adapter.
Figure 20:
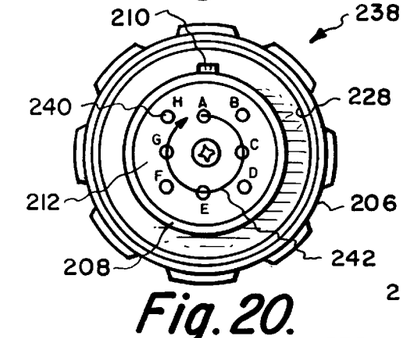
FIG. 20 is a view similar to FIG. 16 but of an connector that has eight in number of separate optical cables mounted within the connector showing how the adapter can be utilized to view four in number of the termini of the cable connector.
Figure 21:
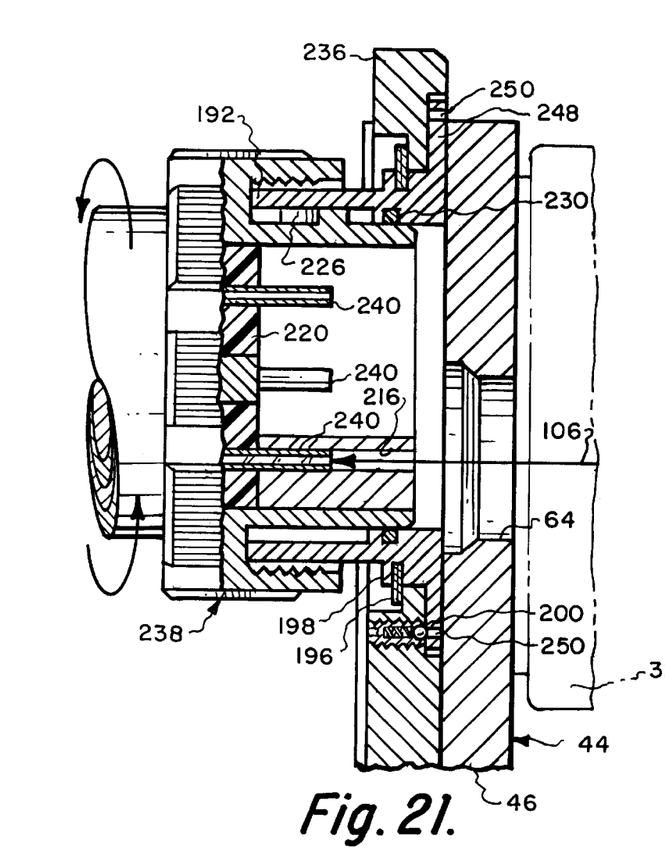
FIG. 21 is a vertical cross-sectional view taken along line 21—21 of FIG. 19.
Figure 22:
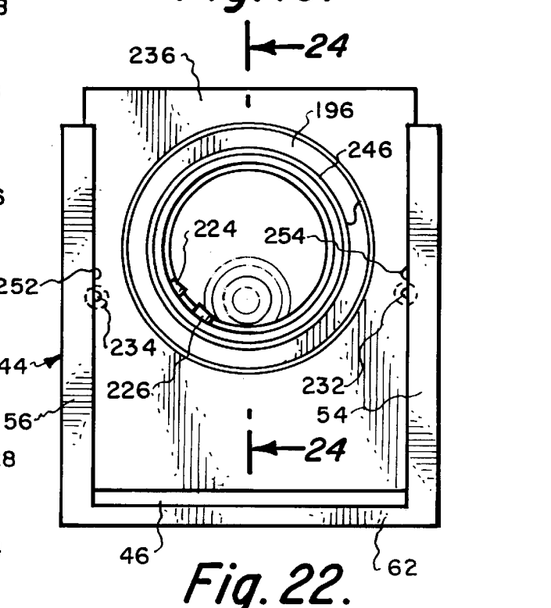
FIG. 22 is a view similar to FIG. 19 but where the adapter is positioned to view the remaining four in number of termini within the cable connector of FIG. 20.
Figure 23:
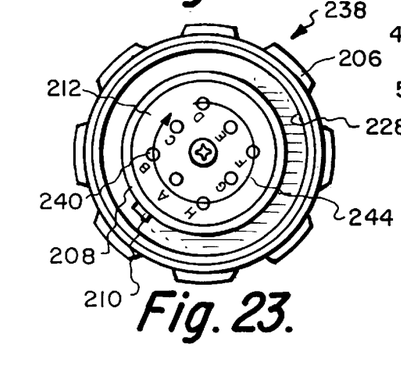
FIG. 23 is a view similar to FIG. 20 but showing which four in number of optical cables are to be visualized with the adapter in the position. of FIG. 22.
Figure 24:
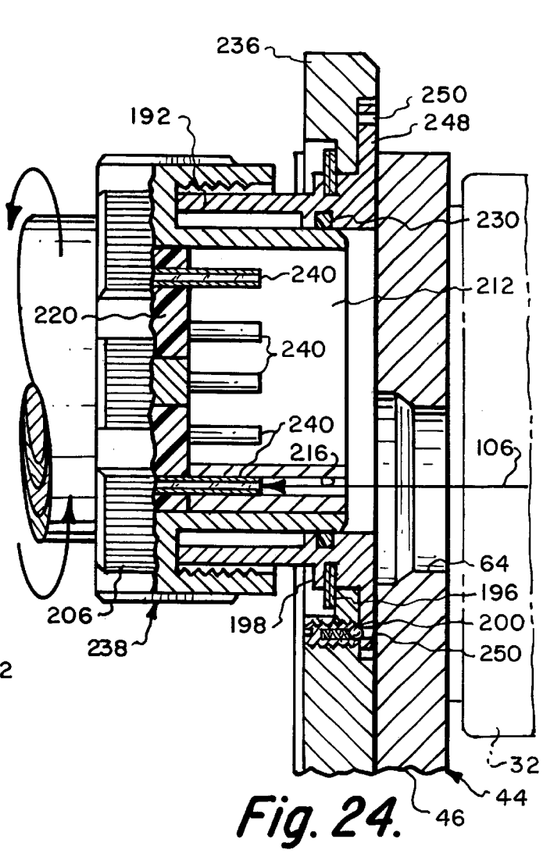
FIG. 24 is a vertical cross-sectional view taken along line 24—24 of FIG. 22.
Figure 25:
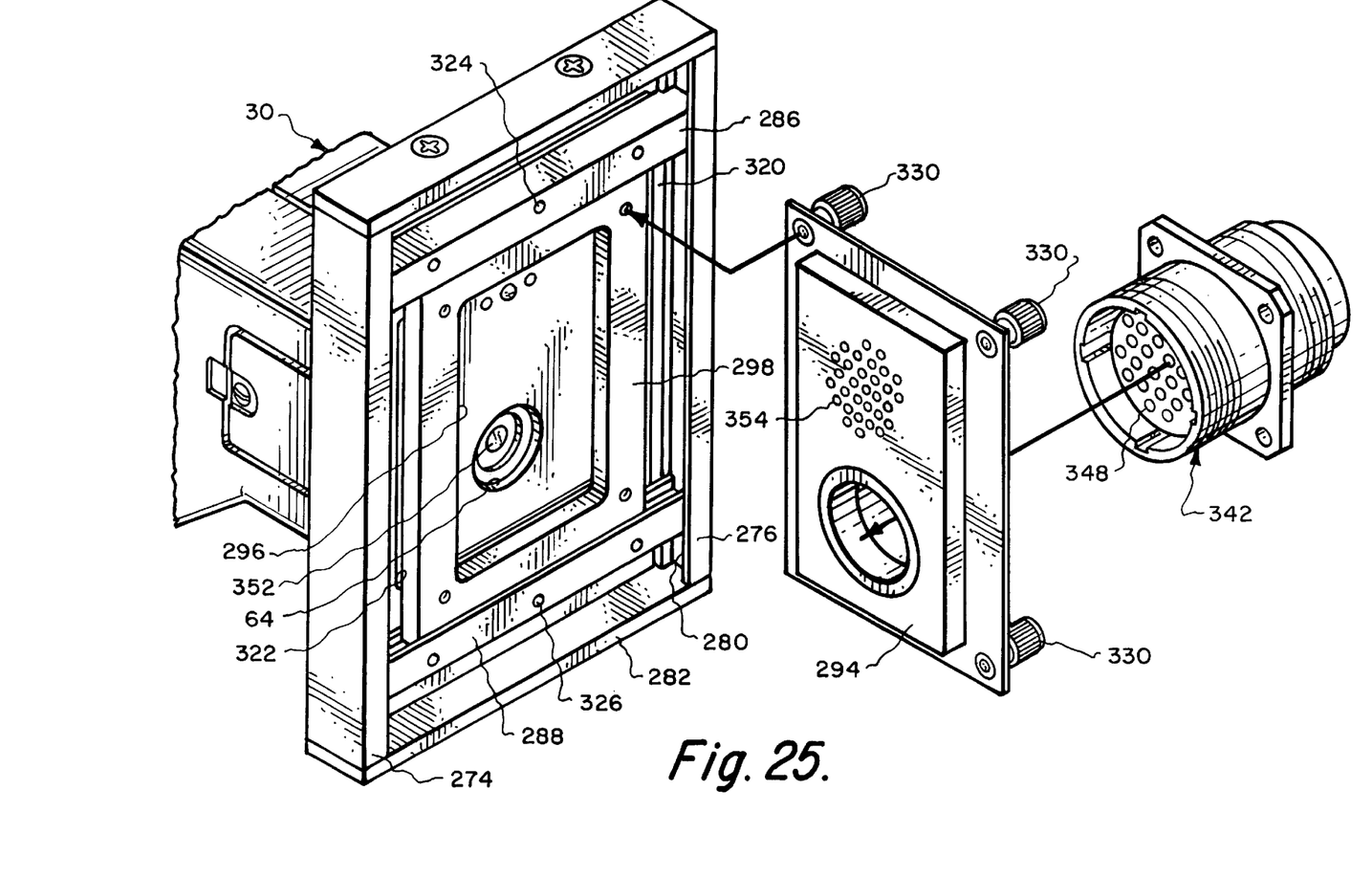
FIG. 25 is an isometric view of an LED indicator adapter system that is usable in conjunction with a connector that has an array of optical fibers.
Figure 26:
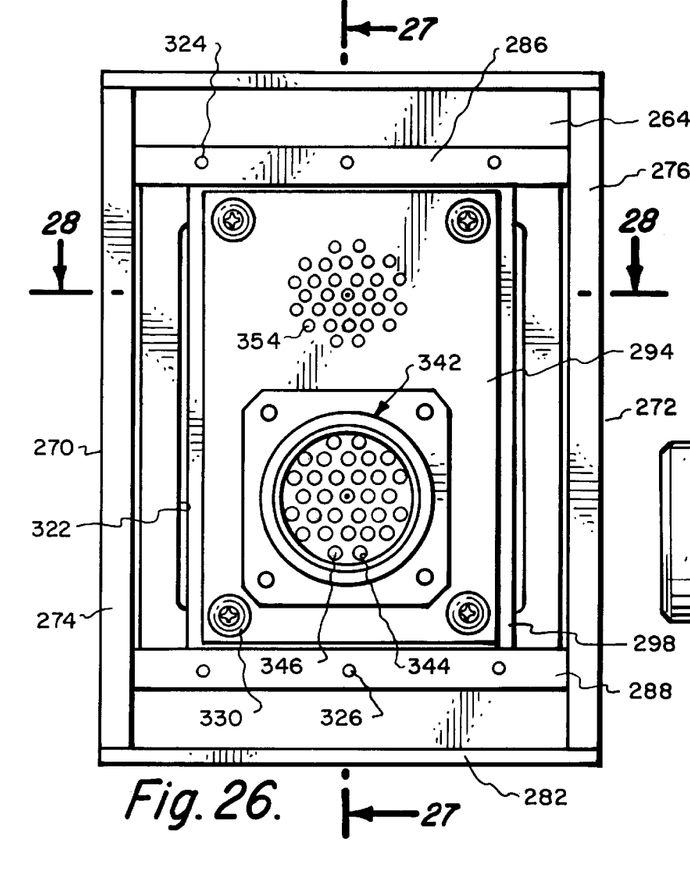
FIG. 26 is an end view of the LED indicator adapter system of this invention.
Figure 27:
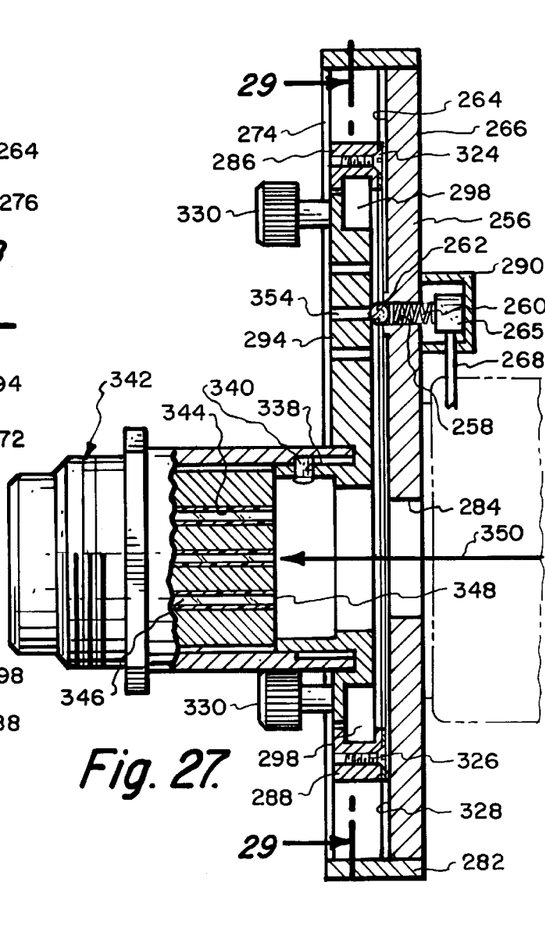
FIG. 27 is a cross-sectional view taken along line 27—27 of FIG. 26.
Figures 28, 29:
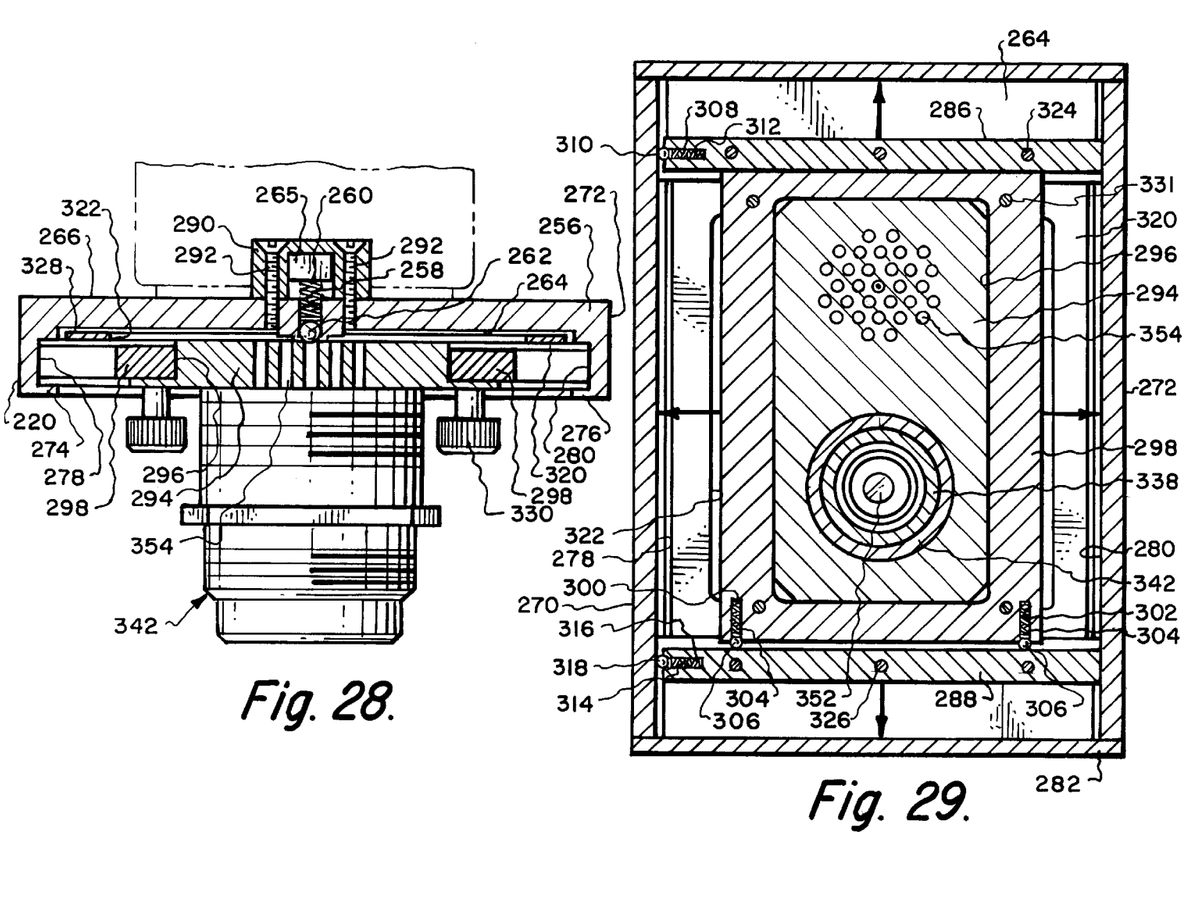
FIG. 28 is a cross-sectional view 28—28 of FIG. 26.
FIG. 29 is a cross-sectional view 29—29 of FIG. 27.
Figure 30:
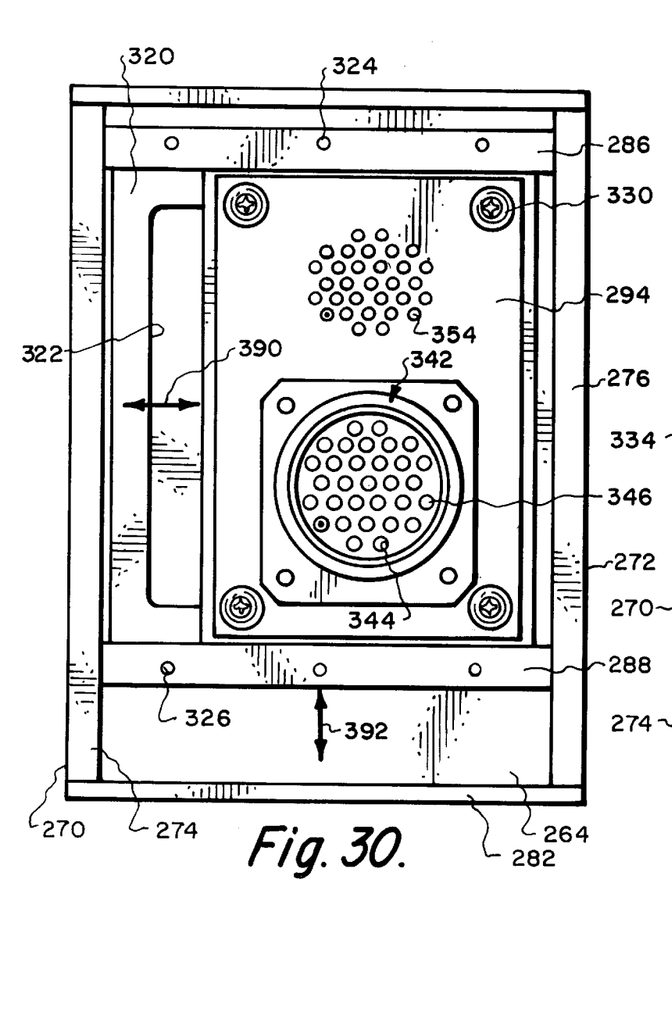
FIG. 30 is a view similar to FIG. 26 but showing the adapter system in a different position to observe a different optical fiber terminus by the inspection microscope.

Referring particularly to FIGS. 12 and 13 of the drawings, there is shown the fourth configuration of male adapter of this invention which utilizes a plate 150 which is basically similar to previously described plate 82. The plate 150 has formed therein a pair of spaced-apart holes 152 and 154. Mountable by screw fasteners 156 on the plate 150 is a single retainer housing 158 within which are mounted a pair of connectors 160 and 162. Aligning sleeve 164 is to be centrally located within the hole 152. Aligning sleeve 166 is to be centrally located within the hole 154.

When the terminus 168 of the connector 162 is being observed, the hole 170 will connect with the ball 70 and hole 172 will connect with the ball 72. In this position, the bottom edge 174 of the plate 150 is located as shown in solid lines in FIG. 12.

In order to observe the terminus 176 of connector 160, it is necessary to only slide the plate 150 in the grooves 58 and 60 until hole 178 connects with ball 72 and hole 180 connects with ball 70. The bottom edge 174 of the plate 150 is now located at surface 175 as shown in FIG. 12.

Referring particularly to FIGS. 14–17 of the drawings, there is shown the fifth configuration of male adapter which includes a plate 184 which is, again, similar to plate 82. The plate 184 includes an enlarged hole 186 which is located on the back side of an annular protrusion 188. On the front side of annular protrusion 188 is a hole 190. Rotatably mounted within the holes 186 and 190 is a fitting 192. Fitting 192 includes a circular backplate 194 which is located within the hole 186. A snap ring 196 is located against the annular protrusion 188. An annular ridge 198 of the fitting 192 abuts against the snap ring 196. The snap ring 196 and the annular ridge 198 are located within the hole 190. As a result, the fitting 192 is freely rotatable relative to the plate 184.

It is to be noted that mounted within the plate 184 is a detent ball 200. The detent ball 200 is to be engagable with any one of five in number of holes 202 which are equiangularly spaced-apart and formed within the back plate 194. When the fitting 192 is rotated within the plate 184 and when a ball 200 engages with a hole 202, a particular position is then established of the fitting 192 relative to the plate 184. It is to be understood that there is actually five in number of different positions because there are five in number of the holes 202.

The fitting 192 is to matingly connect with a fiberoptic cable end connector 204. The connector 204 is defined by an outer ring 206 which encompasses a center tube 208. Mounted on the exterior surface of the center tube 208 is a rib 210. Mounted within the center tube 208 is a housing 212. Mounted within the housing 212 in a spaced-apart arrangement is a plurality of fiberoptic termini (not shown) each of which have a sleeve 214 which is mounted within a hole 216 formed within the housing 212. The housing 212 is fixedly mounted by a fastener 218 to a base 220 which is included within the connector 204. In another similar version there would not be used a housing 212.

The rib 210 is to be located within the space 222 located between a pair of pins 224 and 226 which are mounted on the inside surface of the fitting 192. Fitting 192 is located within the annular space 228 of the connector 204 which is located between the center tube 208 and the outer ring 206. Center tube 208 forms a snug connection with the fitting 192 by means of O-ring seal 230. When the rib 210 is located within the space 222 with the plate 194 in the position shown in FIG. 14, one of the holes 202 connect with the ball 200 and the light that is transmitted through in the direction of arrow 106 illuminates the terminus that is denoted with the letter "C" in FIG. 16. Pivoting of the connector 204 and the fitting 192 seventy-two degrees in a clockwise direction, referring to FIG. 16, will result in the terminus denoted with the letter "D" then being aligned with the transmission of light of arrow 106. Continued rotation of seventy-two degrees will align each terminus with the light being transmitted in the direction of arrow 106. Therefore, it is to be understood that by pivoting of the fitting 192 into the increments of seventy-two degrees, each terminus will be capable of being observed by the light from the microscope 30. It is to be understood that when the plate 184 is mounted in conjunction with the grooves 58 and 60 that hole 232 will connect with the ball 70 and hole 234 will connect with the ball 72 thereby defining the precise position of the plate 184 relative to the microscope 30.

Referring particularly to FIGS. 18–24, there is shown the sixth configuration of adapter assembly of this invention. The sixth configuration of adapter assembly is basically similar to the fifth configuration and like numerals have been utilized to refer to like parts. However, instead of plate 184 there is shown a plate 236 and instead of connector 204 there is shown a connector 238. Again, like numerals that were used in conjunction with connector 204 have been used in conjunction with connector 238 to refer to like parts. However, the connector 238 has mounted within the housing 212 eight in number of fiberoptic termini 240 rather than the five in number that are shown in the connector 204. It is to be noted that termini A, C, E and G are all on one circle 242. Additionally, the termini B, D, F and H are on another circle 244. Circle 242 is concentric with circle 244.

Rotationally mounted within the plate 236 is a fitting 246 with fitting 246 being basically similar to fitting 192. The only difference of fitting 246 is that within the back plate 248 there are located a series of evenly spaced-apart holes 250 which are equivalent to the holes 202 with the exception that the holes 250 are located forty-five degrees apart rather than seventy-two degrees apart. Also, the plate 236 not only includes holes 232 and 234, but also includes holes 252 and 254. With hole 232 connecting with ball 70 and hole 234 connecting with ball 72, the termini that are located on circle 244 are capable of being aligned with the transmission of light which is represented by arrow 106. Moving from terminus "B" to "D" requires the pivoting of the fitting 246 of ninety degrees so that a hole 250 will be skipped when moving from one hole 250 to another hole 250. Then when moving from terminus "D" to "F" again requires a movement of ninety degrees, and so forth. When hole 254 connects with ball 70 and hole 252 connects with ball 72, the termini "A", "C", "E" and "G" are capable of being positioned in alignment with the transmitted light denoted by arrow 106. Again in moving between the termini "A", "C", "E" and "G", the holes 250 that are spaced ninety degrees apart that were located between the previously discussed holes 250 will then be used as detents for establishing the position for each of the termini "A", "C", "E" and "G".

Referring particularly to FIGS. 26–30 of the present application, there is shown a seventh configuration of adapter assembly of this invention. The microscope 30 still has a baseplate 256 which is basically similar to baseplate 46. The only difference is baseplate 256 includes a hole 258 within which is located a coil spring 260. The outer end of the coil spring 260 abuts against a translucent ball 262 which projects slightly past the flat surface 264 of the baseplate 256. The hole 258 connects with a housing 265 which is mounted exteriorly of the rear surface 266 of the baseplate 256. The housing 265 is mounted within a protective cover 290. This protective cover 290 is fixedly mounted by screw fasteners 292 to the baseplate 256. Within the housing 265 is to be located a LED (light emitting diode) which is not shown. The LED is electrically connected by wire 268 to a source of electricity which would be the battery contained within the microscope 30.

The baseplate 256 has parallel sidewalls 270 and 272. Sidewall 270 includes an inwardly projecting flange 274. Sidewall 272 includes an inwardly projecting flange 276. The flange 274 in conjunction with the flat surface 264 produces a groove 278. Similarly, the flange 276 in conjunction with the flat surface 264 produces a groove 280. Also located at the bottom end of the baseplate 256 and extending between the sidewalls 270 and 272 is an end wall 282. Mounted within the baseplate 256 is a hole 284. Centered within the hole 284 is to be the visual inspection window 38 of the microscope 30.

Extending between the grooves 278 and 280 is an upper rail 286 and a lower rail 288. The upper rail 286 is spaced from the lower rail 288. The rails 286 and 288 are located parallel. The rails 286 and 288 are slidable within the grooves 278 and 280. Mounted between the rails 286 and 288 is a rectangularly shaped adapter plate 294. The adapter plate 294 is mounted within the enlarged opening 296 of a rectangularly shaped enclosing ring 298. This ring 298 has holes 300 and 302 each of which includes a coil spring 304 and a ball 306. The balls 306 protrude slightly from the peripheral surface of the ring 298. The balls 306 rides against the lower rail 288. The balls 306 functions to prevent rotation of the ring 298 between the rails 286 and 288 and permit low frictional sliding movement of the ring 298 relative to the rails 286 and 288. It is to be noted that the rail 286 includes a coil spring 308 and a ball 310 mounted within a hole 312 formed within the upper lid 286. In a similar manner, the lower rail 268 includes a hole 314 within which is mounted a coil spring 316 which connects with a ball 318. The balls 310 and 318 function to prevent rotation of the rails 286 and 288 and freely slidable between the grooves 278 and 280. The rails 286 and 288 are connected together to operate as a single unit. This connection is provided by a connecting ring 320. The connecting ring 320 includes an enlarged center opening 322. The connecting ring 320 is fixed to the rail 286 by three in number of screw fasteners 324. In a similar manner, the connecting ring 320 is fixedly mounted by screw fasteners 326 to the lower rail 288. Space within the baseplate 256 is provided for the connecting ring 320 by cutout area 328. Movement of the adapter plate 294 relative to the baseplate 256 is to be accomplished in the direction of arrows 390 and 392.

Mounted within the enlarged opening 296 is the adapter plate 294. Mounted at each corner of the adapter plate 294 is a manually turnable knob 330. It is to be understood that there are four in number of the knobs 330. Each knob 330 threadably connects with a threaded hole 331 formed in enclosing ring 298. Tightening threading of each of the knobs 330 will result in securement of the adapter plate 294 to the connecting ring 298. Loosening of the knobs 330 will result in the adapter plate 294 being disassembled from the enclosing ring 298. This can permit reinstallation of a different configuration of adapter plate such as adapter plate 334 in FIG. 31 and adapter plate 336 in FIG. 32.

The adapter plate 294 includes a fitting 338. The fitting 338 includes an alignment pin 340. A connector 342, which is basically similar to connectors 204 and 238, is to be mountable in conjunction with the fitting 338 with the alignment pin 340 functioning to permit only a single mounting position relative to the fitting 338. The connector 342 has a specific pattern of holes 344 known as an arrangement. Mounted within each hole 344 is terminus 348. Each terminus 348 has an optical fiber 346. Light is to be emitted in the direction of arrow 350 from the microscope 30 through lens 352. This light is conducted through the center of hole 284. When a terminus 348 of an optical fiber 346 is aligned with arrow 350, that terminus of that fiber is observable by the microscope 30. As to which particular terminus 348 is being observed, the ball 262 will engage in a detent manner with a particular hole 354 formed within the adapter plate 294. By referring to FIGS. 26 and 30, it can be seen that there are thirty-one in number of the holes 344. The pattern and number of the holes 344 is reproduced by the holes 354 and is known as a replica. Therefore, as in FIG. 26, the arrow 350 is aligned with the center hole 344 of the holes 344. The ball 262 will be engaged with the center hole 354. Therefore, the user can observe the adapter plate 294 and by moving the adapter plate 294 horizontally and vertically can adjust the adapter plate 294 so that each and every fiberoptic terminus 348 can be aligned with arrow 350. When a particular terminus 348 is aligned with the arrow 350, the corresponding hole 354 will be connected with the ball. 262 which functions to lock slightly the position of the adapter plate 294 because of the engagement of the ball 262 with the particular hole 354. When the user depresses button 42, the translucent ball 262 will be illuminated and be readily observable by the user informing the user exactly which of the end faces 348 is in alignment with the arrow 350 and is being observed by the microscope 30. Applying a slight physical pressure against the adapter plate 294 can unseat the ball 262 from the respective hole 354 permitting the ball 262 to engage with another one of the holes 354.

Figure 31:
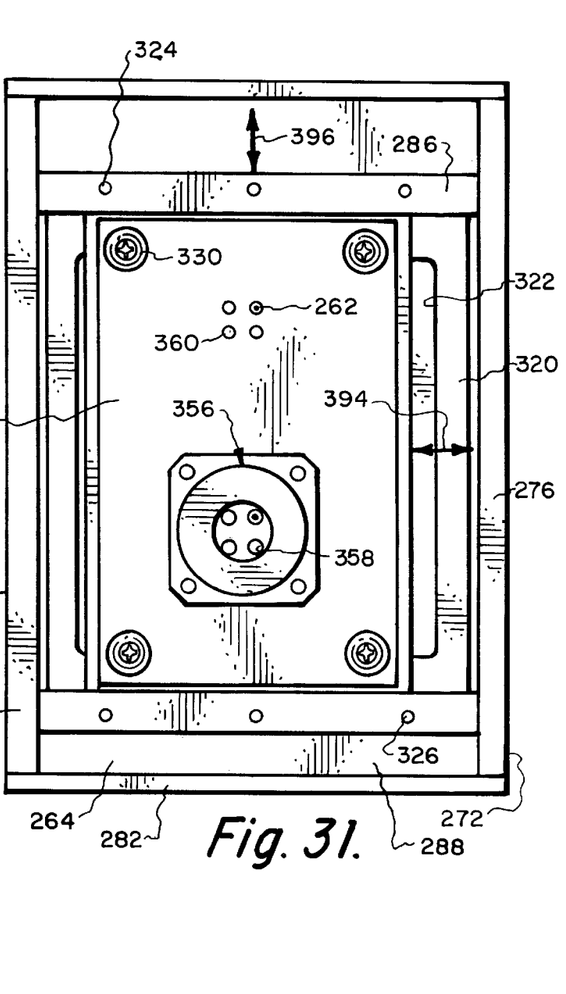
FIG. 31 is a view similar to FIG. 30 but shows an adapter system for a fiberoptic connector for a much smaller number of optical fibers than were shown in FIG. 30.

As previously mentioned, the adapter plate 294 can be removed and a new adapter plate 334 installed in the same position with the ring 298. The adapter plate 334 has a fitting which connects to a different type of connector 356 which is shown to have only four in number of optical fibers 358. The same pattern of the optical fibers 358 is reproduced in the adapter plate 334 by holes 360. When the ball 262 engages with a hole 360, the corresponding optical fiber 358 will be aligned with the arrow 350.

Figure 32:
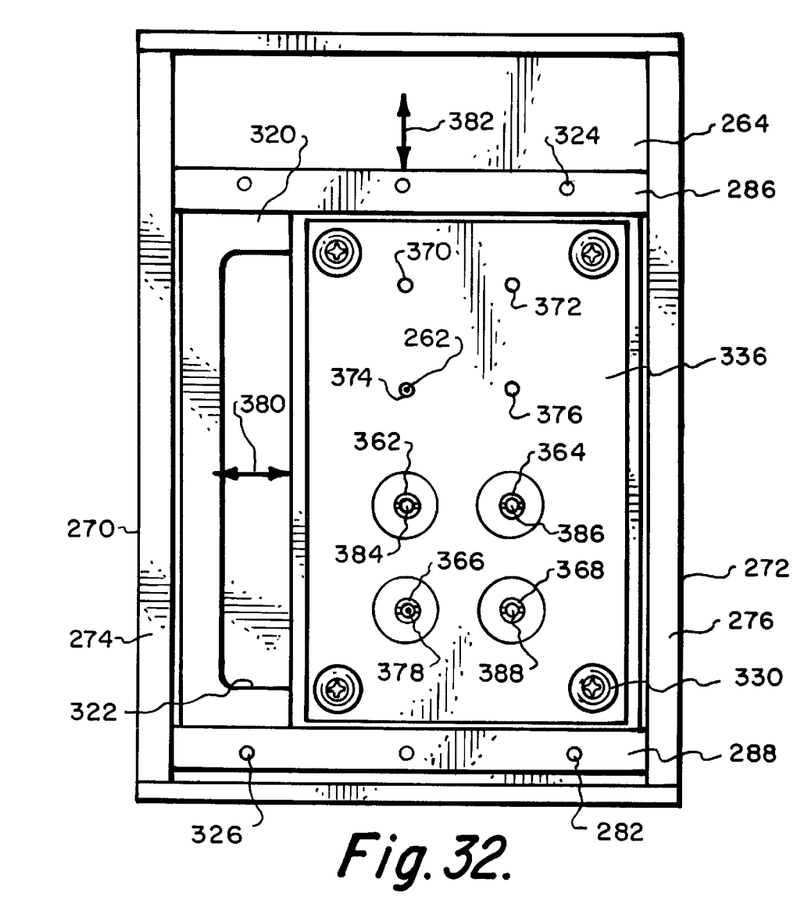
FIG. 32 is a view similar to FIG. 31 but of a still different type of connector arrangement that still utilizes the LED indicator.

Referring particularly to FIG. 32, the adapter plate 336, instead of having a single connector, such as connectors 342 and 356, has four in number of separated apart connectors 362, 364, 366 and 368. Connector 362 has a corresponding hole 370. Connector 364 has a corresponding hole 372. Connector 366 has a corresponding hole 374. Connector 368 has a corresponding hole 376. The ball 262 is shown engaging with hole 374 which means that the optical fiber terminus 378 of connector 366 is in alignment with arrow 350. Optical fiber terminus 378 is what will be observed. Movement of the adapter plate 336 in direction of arrows 380 and 382 will permit adjusting of the adapter plate 336 to the different holes 370, 372 and 376 and hence observation of the terminus 384 of connector 362, observation of the terminus 386 of connector 364 and observation of the terminus 388 of connector 368.

What is claimed is:

1. In combination with a fiberoptic termination inspection microscope having a visual inspection window formed within a housing, a female adapter fixedly mounted on said housing, said female adapter located directly adjacent said visual inspection windows said female adapter having female engaging means, the improvement comprising:

a male adapter having male engaging means, said male engaging means to matingly connect with said female engaging means, said male adapter being disengagable from said female adapter disconnecting said male engaging means from said female engaging means, said male adapter having connection means for connecting with a fiberoptic cable terminus, whereby placement of said fiberoptic cable terminus in alignment with said visual inspection window permits observation by a user viewing through an eyepiece mounted on said housing;

said male adapter being in the form of a plate, said plate slidingly engaging with said female adapter; and said plate has a first detent for fixing said plate in a first exact position relative to said female adapter when using of said microscope, said connection means to connect with a single fiberoptic cable terminus.

2. In combination with a fiberoptic termination inspection microscope having a visual inspection window formed within a housing, a female adapter fixedly mounted on said housing, said female adapter located directly adjacent said visual inspection window, said female adapter having female engaging means, the improvement comprising:

a male adapter having male engaging means, said male engaging means to matingly connect with said female engaging means, said male adapter being disengagable from said female adapter disconnecting said male engaging means from said female engaging means, said male adapter having connection means for connecting with a fiberoptic cable terminus, whereby placement of said fiberoptic cable terminus in alignment with said visual inspection window permits observation by a user viewing through an eyepiece mounted on said housing;

said male adapter being in the form of a plate, said plate slidingly engaging with said female adapter; and said connection means for connecting with a plurality of fiberoptic cable termini, said male adapter being adjustable to different positions, indicator means mounted on said male adapter, said indicator means for indicating to a user exactly which position of said different positions said male adapter is located informing the user exactly which said fiberoptic terminus is being observed by said inspection means.

3. The combination as defined in claim 2 wherein:

said fiberoptic cable termini being arranged in a specific arrangement, said male adapter including a replica of said specific arrangement, positioning of said indicator means at a particular location within said replica will inform the user that the corresponding fiberoptic cable terminus is in alignment with said visual inspection window of said microscope.

4. The combination as defined in claim 3 wherein:

said indicator means includes an illumination device.

5. The combination as defined in claim 4 wherein:

said illumination device comprising said light emitting diode.

6. The combination as defined in claim 4 wherein:

said illumination device also functioning as a detent mechanism for looking onto said particular location.

7. An adapter system for installing a fiberoptic cable terminus onto a microscope housing comprising:

a female adapter fixedly mounted on the microscope housing, said female adapter surrounding a visual inspection window of the microscope;

a male adapter removably engagable with said female adapter, said male adapter having connection means for removably connecting with the fiberoptic cable terminus, whereby placement of the fiberoptic cable terminus in alignment with the visual inspection window permits observation by the user viewing through an eyepiece on the microscope housing;

said male adapter being in the form of a plate, said plate slidingly engaging with said female adapter; and said plate has a first detent for fixing said plate in a first exact position relative to said female adapter when using of said microscope, said connection means to connect with a single fiberoptic cable terminus.

8. An adapter system for installing a fiberoptic cable terminus onto a microscope housing comprising:

a female adapter fixedly mounted on the microscope housing, said female adapter surrounding a visual inspection window of the microscope;

a male adapter removably engagable with said female adapter, said male adapter having connection means for removably connecting with the fiberoptic cable terminus, whereby placement of the fiberoptic cable terminus in alignment with the visual inspection window permits observation by the user viewing through an eyepiece on the microscope housing;

said male adapter being in the form of a plate, said plate slidingly engaging with said female adapter; and said connection means for connecting with a plurality of fiberoptic cable termini, said male adapter being adjustable to different positions, indicator means mounted on said male adapter, said indicator means for indicating to a user exactly which position of said different positions said male adapter is located informing the user exactly which fiberoptic cable terminus is being observed by said inspection microscope.

9. The combination as defined in claim 8 wherein:

the fiberoptic cable termini being arranged in a specific arrangement, said male adapter including a replica of said specific arrangement, positioning of said indicating means at a particular location within said replica will inform the user that the corresponding fiberoptic cable terminus is in alignment with said visual inspection window of said microscope.

10. The combination as defined in claim 9 wherein:

said indicator means includes an illumination device.

* * * * *